May 16, 1967 SATOSHI SHIMADA ET AL 3,320,362

KEYED A.G.C. CIRCUIT FOR TELEVISION RECEIVERS

Filed June 24, 1963 3 Sheets-Sheet 1

Inventors
Satoshi Shimada
Toshihiro Fujimoto by Hill, Sherman, Meroni, Gross & Simpson Attys.

May 16, 1967 SATOSHI SHIMADA ET AL 3,320,362

KEYED A.G.C. CIRCUIT FOR TELEVISION RECEIVERS

Filed June 24, 1963 3 Sheets-Sheet 2

Inventors
Satoshi Shimada
Toshihiro Fujimoto by Hill, Sherman, Meroni, Gross & Simpson Attys.

Inventors
Satoshi Shimada
Toshihiro Fujimoto
by Hill, Sherman, Meroni, Gross & Simpson
Attys.

United States Patent Office 3,320,362
Patented May 16, 1967

3,320,362
KEYED A.G.C. CIRCUIT FOR TELEVISION RECEIVERS

Satoshi Shimada, Tokyo, and Toshihiro Fujimoto, Chiba-ken, Japan, assignors to Sony Corporation, Tokyo, Japan, a corporation of Japan Filed June 24, 1963, Ser. No. 289,963
3 Claims. (Cl. 178—7.3)

This invention was evolved with the general object of providing improved circuits for automatically controlling gain or frequency, having a high degree of stability and reliability while being relatively simple and inexpensive in construction, using a minimum number of component parts. The circuits of this invention were particularly designed for and are particularly advantageous in television receivers, but it will be appreciated that various features of the invention have other applications as well.

One type of gain control circuit of the prior art is the keyed or gated automatic gain control circuit of television receivers, wherein a gating circuit directly connected to the output of a video detector circuit is made to operate only for the duration of horizontal synchronizing pulses to obtain a direct current output signal which is applied to one or more preceding amplifier stages to automatically control gain, usually through a D.C. amplifier circuit having three or more stages which must be concatenated in order to provide adequate control of gain. Similar types of circuits have been used in the automatic control of frequency.

Such prior art circuits have not been stable and reliable in operation and this invention is based in part upon the discovery that the instability and unreliability of such circuits is due to the effect of variations in the operating characteristics of elements of the D.C. amplifier, due to aging of components, variations in temperature, and variations in other operating conditions. The instability of such circuits might be reduced by using a negative feedback circuit, as by inserting resistance in the emitter circuit of a transistor amplifier stage, but even then the instability cannot be completely eliminated and in addition, the effectiveness of the control would be reduced.

According to this invention, a high frequency signal is obtained proportional in amplitude to the output of a stage whose output is to be regulated, such as the output of a video amplifier, in the case of a television receiver gain control circuit, or the output of a discriminator circuit in an automatic frequency control circuit. The high frequency signal so obtained is amplified and is then applied to a detector circuit to develop a D.C. signal for control purposes. With this arrangement, the high frequency signal can be amplified by a high factor with a high degree of stability, preferably with a band pass amplifier circuit, and a large amplitude D.C. control signal is obtained without using the concatenated D.C. amplifier stages of the prior art circuits.

Important features of the invention reside in an arrangement for deriving the high frequency signal from a video intermediate frequency amplifier in a television receiver, and in the derivation of the high frequency signal from the portion of the video intermediate frequency signal corresponding to the horizontal synchronizing pulses. With such features, a keying or gating action is obtained and the sensitivity of a circuit to random noise signals and variations in operating conditions such as supply voltage and temperature, is greatly reduced.

In a preferred arrangement, an amplifier is operated non-linearly, either class AB, class B or class C to respond mainly to the higher amplitude portions of the video signals which occur during the horizontal synchronizing pulses. In the alternative, or in addition, the high frequency signal deriving circuit may be controlled from signals developed during the horizontal synchronizing pulse intervals, such control signals being preferably developed from the horizontal deflection circuit of the television receiver.

This invention contemplates other and more specific objects, features and advantages which will become more fully apparent from the following detailed description taken in conjunction with the accompanying drawings which illustrate a preferred embodiment and in which.

Figure 1:
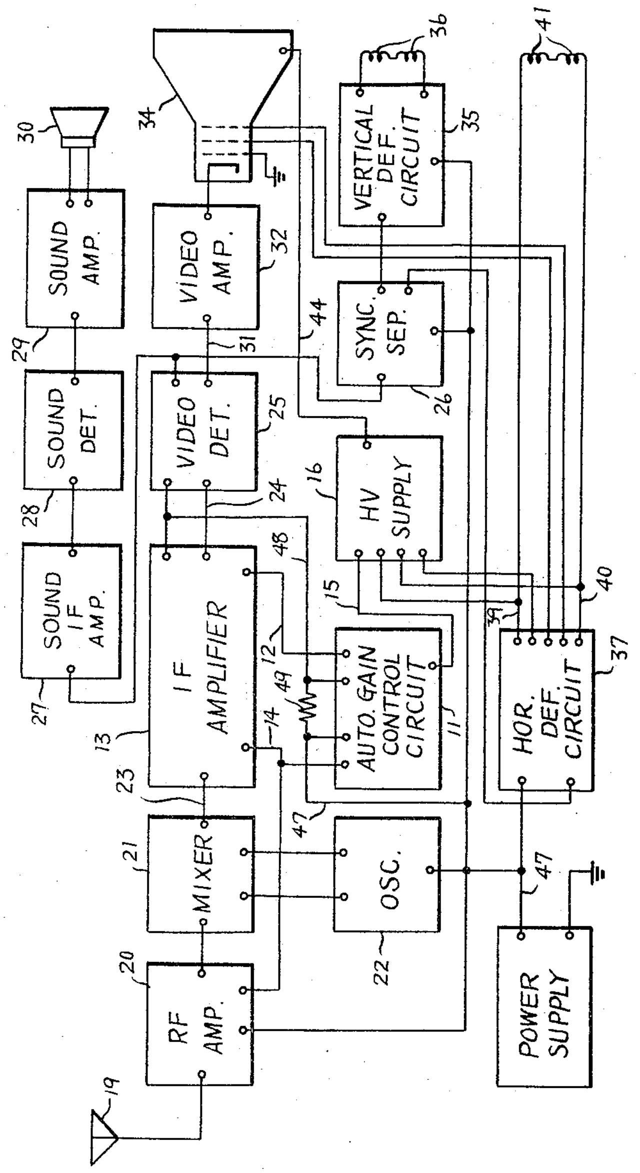
FIGURE 1 is a block diagram of a television receiver incorporating an automatic gain control circuit according to this invention.

Reference numeral 10 generally designates a television receiver which incorporates an automatic gain control circuit 11 constructed according to the principles of this invention.

In brief, the automatic gain control circuit 11 receives on a line 12 a video intermediate frequency signal from an output stage an I.-F. amplifier 13 and develops a D.C. output signal on a line 14 connected to stages of the I.-F. amplifier 13 to control the gain thereof. The gain control circuit 11 is also connected through a line 15 to a high voltage supply circuit 16 to receive fly-back pulses developed during horizontal synchronizing pulse intervals, for performing a keying or gating action.

Figure 2:
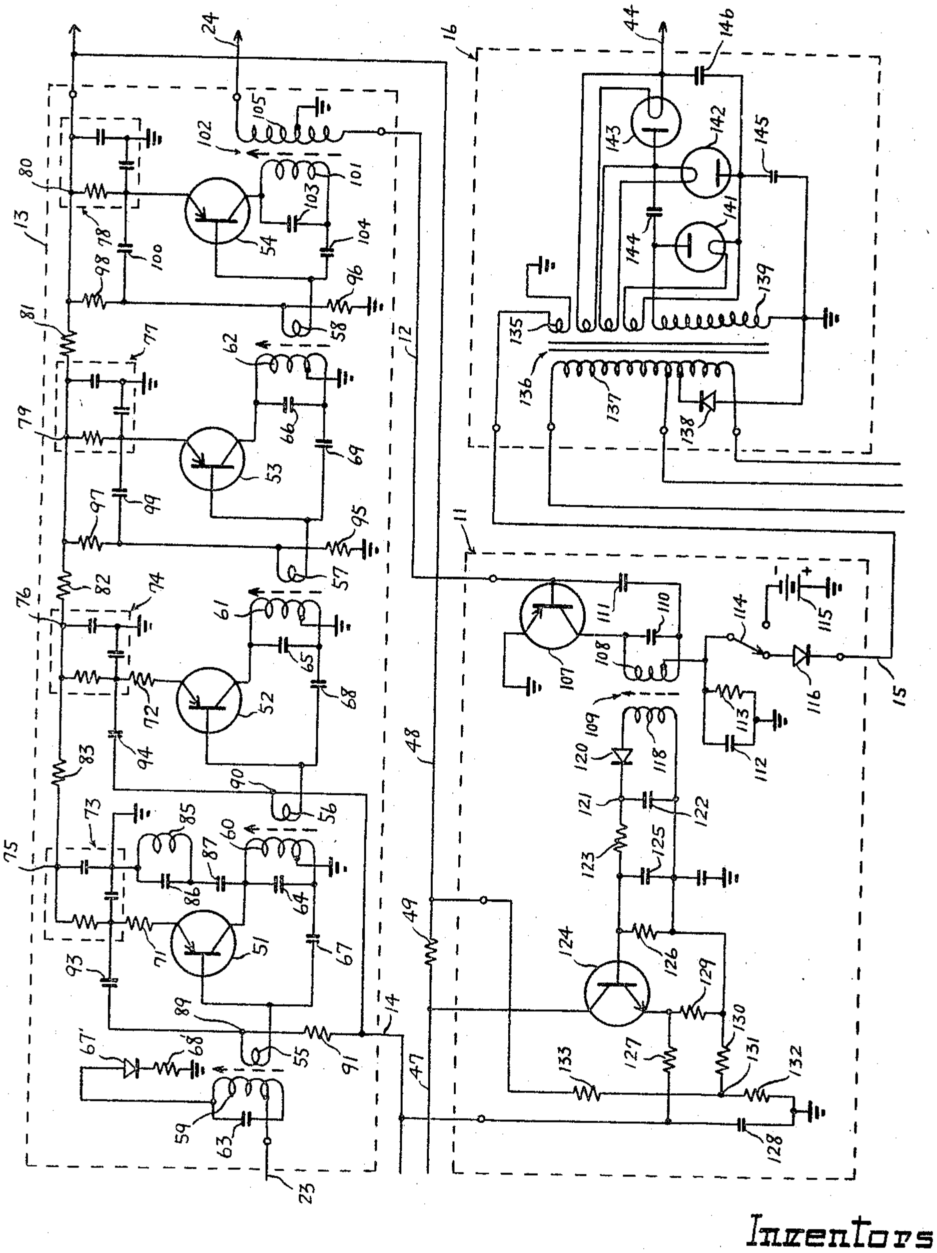
FIGURE 2 is a circuit diagram of portions of the receiver of FIGURE 1, including a video I.-F. amplifier, a video detector, an automatic gain control circuit and a high voltage generating circuit.

The circuits of the gain control circuit 11, the I.-F. amplifier 13 and also the high voltage supply circuit 16 are illustrated in FIGURE 2 and are described in detail below. Except for such circuits, the television receiver 10 may be conventional in construction. Signals are applied from an antenna 19 to an R.-F. amplifier 20 the output of which is connected to a frequency converter or mixer 21 to which an oscillation frequency signal is applied from a local oscillator 22, to obtain a video intermediate frequency signal due to the difference between the frequency of the input signal from the antenna and the frequency of the oscillator signal. It may be noted that the control line 14 from the automatic gain control circuit 11 may be connected to the R.-F. amplifier 20, to control the gain thereof, and although not shown, the line 14 might also be connected to the oscillator 22 to control the amplitude of oscillations therefrom.

The output of the mixer 21 is applied through a line 23 to the input of the I.-F. amplifier 13, the output of which is applied to a line 24 to a video detector 25 which may include an output drive stage. One output of the video detector is applied to a synchronizing signal separating circuit 26 and is also applied to a sound I.-F. amplifier 27 the output of which is applied to a sound detector 28 to develop an audio signal which is amplified by an amplifier 29 and applied to a speaker 30. A second output of the video detector 25 is applied through a line 31 to a video amplifier 32 the output of which is connected to the cathode of a picture tube 34.

The synchronizing signal separating circuit 26 develops control signals which are applied to a vertical deflection circuit 35 connected to vertical deflection coils 36 for the picture tube 34, and another output of the circuit 26 is applied to a horizontal deflection circuit 37 the output of which is applied through lines 39 and 40 to horizontal deflection coils 41. The horizontal deflection circuit 37 also develops voltages which are applied through lines 42 and 43 to grids of the picture tube 34. The output lines 39 and 40 from the horizontal deflection circuit 37 are additionally connected to the high voltage supply circuit 16 which develops a high voltage on a line 44, applied to a high voltage electrode of the picture tube 14.

A power supply 46 supplies an operating voltage on a line 47 connected to various circuits of the receiver. Operating voltage for the I.-F. amplifier 13 and for a drive output stage of the video detector circuit 25 is supplied from a line 48 which is connected through a resistor 49 to the line 47. Line 48 is also connected to the automatic gain control circuit in a manner to provide a compensating action, as described below.

Referring now to FIGURE 2, the illustrated video I.-F. amplifier 13 comprises four transistors 51–54 having base electrodes respectively connected to terminals of secondary windings 55–58 of I.-F. transformers having primary windings 59–62 tuned by capacitors 63–66. The tap of the first primary winding 59 is connected to the input line 23, one end of the winding 59 being grounded and the other end being connected through a voltage-limiting diode 67′ and the resistor 68′ to ground. The primary windings 60, 61 and 62 have ends connected to the collectors of transistors 51–53, respectively, and opposite ends connected through neutralizing capacitors 67, 68 and 69 to the base electrodes of the transistors 51–53, taps of the primary windings 60–62 being grounded. The emitters of the transistors 51 and 52 are connected through resistors 71 and 72 and through decoupling filters 73 and 74 to circuit points 75 and 76, while the emitters of transistors 53 and 54 are connected directly through decoupling filters 77 and 78 to circuit points 79 and 80. Circuit point 80 is directly connected to the voltage supply line 48 and through a dropping resistor 81 to the circuit point 79 which is connected through another dropping resistor 82 to the circuit point 76 connected through a third dropping resistor 83 to the circuit point 75. Each of the decoupling filters 73, 74, 77 and 78 may comprise a series resistor and a pair of shunt capacitors connected to ground as illustrated.

A trap circuit comprising a coil 85 and a parallel capacitor 86 is connected at one end to ground and at the other end through a coupling capacitor 87 to the collector of the first transistor 51.

To control the amplification of the first two stages of the I.-F. amplifier 13, circuit points 89 and 90 connected to ends of the secondary coils 55 and 56 are connected to the control line 14, circuit point 89 being connected through a resistor 91, and circuit point 90 being directly connected to the line 14. Circuit points 89 and 90 may also be connected through capacitors 93 and 94 to the terminals of the decoupling filters 73 and 74 which are connected to the collectors of the transistors 51 and 52.

It will be appreciated that the amplification of the first two stages, including the transistors 51 and 52, may be controlled by control of the D.-C. bias voltage on the control line 14.

A controllable D.C. bias voltage may also be applied to the final two stages including the transistors 53 and 54, but in the illustrated circuit, fixed biases are applied. In particular, terminals of the secondary windings 57 and 58 are connected through resistors 95 and 96 to ground, through resistors 97 and 98 to circuit points 79 and 80, and also through capacitors 99 and 100 to the collectors of the transistors 53 and 54.

The collector of the final stage transistor 54 is connected on one end of a primary winding 101 of an output I.-F. transformer 102, the primary winding 101 being connected in parallel with a tuning capacitor 103 with the other end thereof connected through a capacitor 104 to the base of the transistor 54 and with a tap of the primary winding 101 being grounded.

The final I.-F. transformer 102 has a secondary winding 105 having one end connected through the line 24 to the video detector 25, and having a tap connected to ground. The other end of the winding 105 is connected to the line 12 to apply the amplified video I.-F. signal to the automatic gain control circuit 11. It may be here noted that although preferred, it is not necessary that the video I.-F. signal applied to the gain control circuit be taken from the final output stage of the I.-F. amplifier, but might be taken from an intermediate stage.

The line 12 is connected to the base of a transistor 107 having its emitter connected to ground and having its collector connected to one end of a primary winding 108 of a transformer 109. The primary winding 108 is tuned to resonance at the video I.-F. frequency by a capacitor 110 and the opposite end thereof is connected through a neutralizing capacitor 111 to the base of the transistor 107. A tap of the primary winding 108 is connected through a by-pass capacitor 112 and a parallel resistor 113 to ground and also to a selector switch contact 114 which is connected either to the negative terminal of a battery 115 having its positive terminal connected to ground, or through a diode 116 to the line 15, connected to the high voltage supply circuit 16.

The transformer 109 has a secondary winding 118, one end of which is connected to a circuit point 119 and the other end of which is connected through a diode 120 into a circuit point 121. Circuit point 121 is connected through a capacitor 122 to the circuit point 119 and is also connected through a resistor 123 to the base of a transistor 124 which is connected to the circuit point 119 through the parallel combination of a capacitor 125 and a resistor 126. The emitter of transistor 124 is connected through a resistor 127 to the output line 14 which is connected to ground through a capacitor 128. The emitter of transistor 124 is also connected through a resistor 129 to the circuit point 119 which is connected through a resistor 130 to a circuit point 131 connected to ground through a resistor 132 and connected through a resistor 133 to the line 48. The collector of the transistor 124 is connected to the power supply line 47.

A fly-back pulse is applied on the line 15 from the high voltage supply circuit 16. In particular, line 15 is connected to one terminal of a winding 135 of a horizontal output transformer 136, the other terminal of the winding 135 being connected to ground.

The transformer 136 has a primary winding 137 with one end thereof and a tap thereof being connected to the output lines from the horizontal depression circuit 37, an additional tap being connected through a damper diode 138 to ground, and the other end being connected to a portion of the horizontal deflection circuit 37 used to supply voltages from the lines 42 and 43, connected to grids of the picture tube 34. A secondary winding 139 is connected at one end to ground and at its other end to a high voltage rectifying circuit including rectifiers 141, 142 and 143 and capacitors 144, 145 and 146, used to develop a high voltage from the line 44, heater voltages for the rectifiers 141–143 being applied from additional secondary windings of the transformer 136. The particular construction of the illustrated high voltage supply circuit is not important, and other forms of rectifier circuits may be used.

*Operation*

Figure 3:
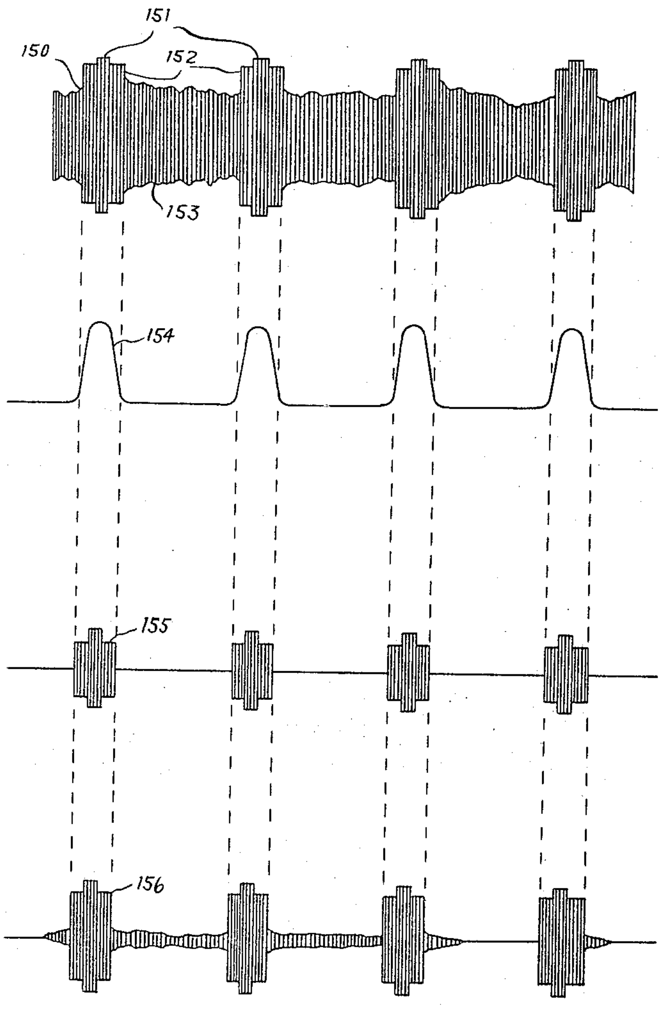
FIGURE 3 illustrates waveforms at various points of the circuits of FIGURE 2, for explaining the operation thereof.

The I.-F. amplifier develops an output signal having a general form as indicated by reference numeral 150 in FIGURE 3, including horizontal synchronizing pulse portions 151 on blanking pedestal portions 152 with a video signal portion 153 intermediate the blanking pedestal portions 152. The relative durations of the synchronizing pulse and blanking pedestal portions, as illustrated, are much greater than is actually the case in practice, to clarify illustration.

The fly-back pulse signal applied on the line 15 from the high voltage supply circuit 16 has a form as indicated by reference numeral 154 in FIGURE 3, but with reversed polarity with the illustrated type of transistor 107, to apply a highly negative pulse signal to the collector circuit of the transistor 107 during intervals corresponding to the horizontal synchronizing pulse intervals. As a result, there is developed in the secondary 118 of the transformer 109 a signal having the waveform as indicated by reference numeral 155 in FIGURE 3, in the form of high frequency bursts corresponding to the horizontal synchronizing pulses and blanking pedestals, with the video portion 153 eliminated. The signal so developed in the secondary winding 118 is rectified by the diode 120 to charge the capacitor 122 in proportion to the peak value of the synchronizing pulse portion. This signal is applied thorugh the filter or integrating circuit including resistor 123 and capacitor 125 to the base of the transistor 124 which operates as an emitter-follower to develop at the emitter thereof a voltage proportional to the peak value of the synchronizing pulse portions. The signal at the emitter of the transistor 124 is applied through an additional filter or integrating circuit including the resistor 127 and the capacitor 128 to the line 14.

If, for example, the peak value of the synchronizing pulse portions of the video signal should increase, the potential of the line 14 is increased in a positive direction to reduce the amplification factors of the first two stages of the I.-F. amplifier 13. On the other hand, the peak value of the synchronizing pulse portions should decrease, the potential of the line 14 is decreased to increase the amplification factors of the first two stages of the I.-F. amplifier 13. The circuit thus functions to maintain a substantially constant value of the synchronizing pulse portions of the signal at the output of the video I.-F. amplifier 13.

The provision of the resistor 49 between the voltage supply line 47 and the line 48 used to supply voltages to the I.-F. amplifier 13, and also the video detector 25, and the connection of the line 48 through resistor 133 to the circuit point 131 and the emitter circuit of the transistor 124 serves to stabilize the circuit against variations in supply voltage. Thus if the voltage on the line 48 should increase, which would normally tend to increase the amplification in the video I.-F. amplifier 13, the voltage across the resistor 132 is increased to increase the voltage at the emitter of the transistor 124 and to thereby increase the voltage at the line 14, to decrease the amplification of the first two I.-F. amplifier stages. Additional compensation is also obtained from the connection of the collector of the transistor 124 to the supply line 47, which tends to change the potential of the emitter of the transistor 124 in accordance with changes in supply voltage.

The operation as thus far described is then obtained with the switch contact 114 in its illustrated position, wherein fly-back pulses are applied from the line 15 to the collector circuit of the transistor 107. The circuit may also be operated with the contact position to apply a fixed voltage from the battery 115 in the collector circuit of the transistor 107. In this case, the transistor characteristics and the values of the circuit components and the supply voltage are such as to provide non-linear operation, class AB or class B, to amplify by a much greater factor the components of the video I.-F. signal corresponding to the blanking pedestal and synchronizing pulse portions. In this case, a signal is obtained as indicated by reference numeral 156 in FIGURE 3. This signal may contain portions corresponding to the video portion 153 of the video I.-F. signal, but such portions have substantially no effect on the operation of the circuit and the circuit thus operates in substantially the same manner as described above.

It is also possible to apply a bias to the transistor 107 to obtain class C operation and another possibility is the combination of a fixed voltage supply for the transistor 107 with the additional application of fly-back pulses. In general, however, the preferred operation is that illustrated with the collector circuit of the transistor 107 being supplied only with the fly-back pulses, since it insures stable and reliable operation and also does not require additional voltage supply sources.

The circuit of this invention thus has all the noise-reduction and stability advantages of other forms of keyed or gated automatic gain control circuits and has the additional advantages in that no D.C. amplification of the control signal is required, a high degree of amplification of the high frequency signal being readily obtained, in a stable manner. The circuit is extremely stable against ambient temperature changes and changes in operating voltage and other operating conditions. In addition, it requires a minimum number of component parts.

It will be appreciated that with appropriate changes, vacuum tubes or other amplifying devices may be substituted for the illustrated transistors and additional amplification of the high frequency signal portion may be provided ahead of the rectifying or detecting diode 120. Also, the circuit may be used for the automatic control of frequency, with the input of the illustrated control circuit being connected to or formed as a frequency discriminator circuit and with the output thereof being used to control the frequency of tuning of an oscillator or the like.

It will be apparent that other modifications and variations may be effected without departing from the spirit and scope of the novel concepts of this invention.

We claim as our invention:

1. In an automatic control circuit for a television receiver including an R.-F. amplifier stage, a frequency converter stage, an I.-F. amplifier having a plurality of stages, a video detector stage, and means for developing fly-back pulses during horizontal synchronizing pulse intervals, means including a D.C. amplifier having negative feedback for deriving from one stage of said I.-F. amplifier a video I.-F. signal including horizontal synchronizing pulse portions, means associated with at least one of said stages of said receiver preceding said one stage of said I.-F. amplifier for responding to a D.C. input signal to exert a controlling effect on said video I.-F. signal, band pass amplifier means including a D.C. amplifier having negative feedback for amplifying said horizontal synchronizing pulse portions of said video I.-F. signal, rectifier means for converting the output from said band pass amplifier means to a D.C. control signal, means for applying said D.C. control signal to said control means, and means for applying said fly-back pulses to said band pass amplifier means to render said band pass amplifier means operative only during horizontal synchronizing pulse intervals.

2. In an automatic control circuit for a multi-stage system wherein a signal is progressively transferred from one stage to another, means for deriving from one stage of said system a high frequency signal portion, control means associated with a stage preceding said one stage for responding to a D.C. input signal to exert a controlling effect on said high frequency signal portion, band pass amplifier means for amplifying said high frequency signal portion, rectifier means for converting the amplified high frequency signal portion from said band pass amplifier means to a D.C. control signal, means for applying said D.C. control signal to said control means to maintain said high frequency signal portions substantially constant, means for applying operating voltages to the stages of said multi-stage system, and means responsive to said operating voltages for regulating said D.C. control signal to stabilize the system against variations in operating conditions.

3. In an automatic control circuit as defined in claim 2 wherein said applying means includes an emitter-follower amplifier, said means responsive to said operating voltage including means connecting said operating voltages to the emitter of said amplifier.

References Cited by the Examiner

UNITED STATES PATENTS

| | | | |
|---|---|---|---|
| 2,635,184 | 4/1953 | Cotsnorth | 178—7.3 |
| 3,143,707 | 8/1964 | Harman | 325—411 X |
| 3,165,699 | 1/1965 | Henmueller | 325—411 X |

OTHER REFERENCES

Fink: "Television Engineering Handbook," McGraw-Hill, New York, 1957; pp. 16–126, 16–127, 16–142, 16–143, 16–144, 16–146, and 16–147.

General Electric Transistor Manual, 3rd ed. © July 23, 1958.

JOHN W. CALDWELL, *Acting Primary Examiner.*

J. McHUGH, R. L. RICHARDSON, *Assistant Examiners.*